J. I. FREEMAN AND L. J. PETERSON.
PNEUMATIC TIRE CASING.
APPLICATION FILED JULY 21, 1921.
1,407,401.
Patented Feb. 21, 1922.
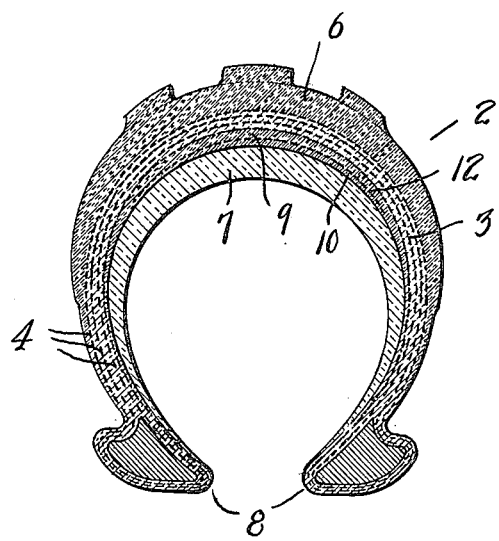
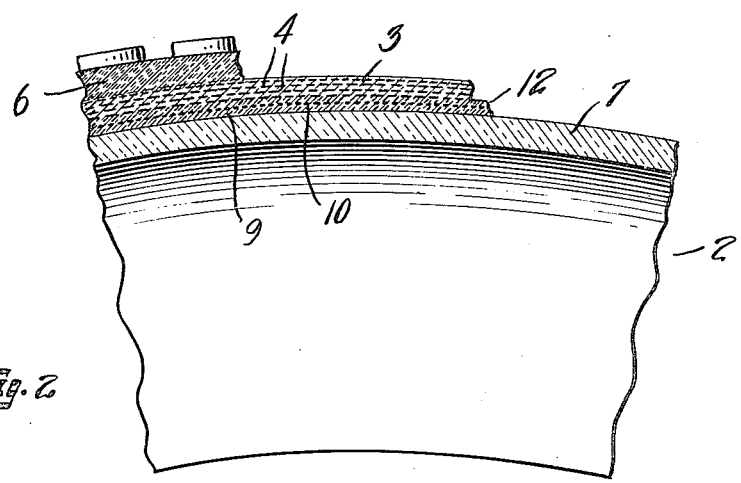
INVENTORS
JAMES I. FREEMAN
LEONARD J. PETERSON
BY
Joseph B. Gardner
their ATTORNEYS.

UNITED STATES PATENT OFFICE.

JAMES I. FREEMAN AND LEONARD J. PETERSON, OF MODESTO, CALIFORNIA.

PNEUMATIC-TIRE CASING.

1,407,401. Specification of Letters Patent. Patented Feb. 21, 1922.

Application filed July 21, 1921. Serial No. 486,458.

*To all whom it may concern:*

Be it known that we, JAMES I. FREEMAN and LEONARD J. PETERSON, citizens of the United States, and residents of Modesto, county of Stanislaus, and State of California, have invented a new and useful Pneumatic-Tire Casing, of which the following is a specification.

Our invention relates to a pneumatic tire casing and particularly to the construction on the inner side thereof.

An object of the invention is to provide a tire casing in which the usual carcass breaks or stone bruises, chafing of the fabric, etc., may be practically eliminated.

Another object of the invention is to prevent the stretching of the casing as well as the inner tube.

The invention possesses other objects and features of advantage, some of which, with the foregoing, will be set forth in the following description of the preferred form of our invention which is illustrated in the drawings accompanying and forming part of the specification. It is to be understood that we do not limit ourselves to the showing made by the said drawings and description, as we may adopt variations of the preferred form within the scope of our invention as set forth in the claims.

Referring to said drawings:

Figure 1 is a transverse section of a tire casing constructed in accordance with our invention.

Figure 2 is a fragmentary longitudinal section of the casing.

The life of the ordinary pneumatic tire is dependent to a large extent, on the intactness of the carcass whether it is the fabric or cord type. As soon as the fabric plies or cord cables become separated or "break", the casing becomes practically useless. The separation or tearing of the carcass members is largely due to underinflation and stone bruises which usually inflict no visible damage to the tread but act primarily on the carcass. Heretofore the carcass on its inner side had been left entirely bare with the result that the fabric plies, especially the inner ones, had to depend for the most part on their own resistance to withstand the various shocks. In accordance with our invention the foregoing disadvantages are overcome and the longevity of the tire casing is assured.

Briefly expressed our invention comprises in providing a cushion strip on the inner side of the carcass, which forms with said carcass and the tire tread a substantially integral unit, and functions to a great extent to absorb and distribute the shocks transmitted to the carcass.

A detailed description follows:

In the present embodiment of the invention the tire casing 2 is of the fabric type and includes the carcass 3 formed of the fabric plies 4, and the usual tread 6. Forming a part of the casing and preferably arranged along the entire inner side of the carcass is a cushion strip 7 made of a rubber stock of considerable resiliency and much softer than the tread 6. At the center portion of the casing the strip 7 is substantially the same thickness as the tread but gradually decreases in thickness as it approaches the ends or beads 8 of the tire. It will thus be seen that, loosely expressed, the cushion 7 forms in effect a breaker strip. Preferably interposed between the cushion 7 and the carcass is a comparatively thin layer 9 of rubber of a stock somewhat harder than that of the cushion and having embedded therein a fabric ply 10 substantially equal in width to and aligned with the tread 6, thereby providing what may be termed a secondary breaker strip 12. The cushion as well as the strip 12 are both preferably formed integral with the casing at the time the latter is manufactured so that a solid compact unit is afforded.

With the inner side of the carcass thus shielded any shock transmitted thereto will be transferred to the cushion and thereby distributed uniformly both transversely and longitudinally of the casing.

The cushion is furthermore advantageous in that it not only aids in preventing the stretching of the casing but functions similarly for the inner tube.

While in the drawings the cushion is shown in connection with a casing of the fabric type it is obvious that the former may be embodied in practically any type of casing without effecting the latter both as to its own size or the inner tube.

We claim:

1. A tire casing comprising a carcass, a tread on the outer side of said carcass, a cushion strip on the inner side of said carcass of gradually decreasing thickness from the center of the tire to the ends, and a reinforcing strip arranged between said cushion and carcass adapted to bind said carcass and cushion into an inseparable unit.

2. A tire casing comprising a carcass, a tread on the outer side of said carcass, a cushion strip on the inner side of said carcass having its center of substantially the same thickness as said tread and being of gradually decreasing thickness from the center of the tire to the ends, a reinforcing strip arranged between said carcass and cushion and adapted to bind them together, and a fabric liner imbedded within said reinforcing strip.

In testimony whereof, we have hereunto set our hands at Modesto, this 12th day of July, 1921.

JAMES I. FREEMAN.
LEONARD J. PETERSON.